Nov. 29, 1938.　　T. J. SCOFIELD　　2,138,212
WINDSHIELD CLEANER MOTOR
Filed Nov. 6, 1936　　2 Sheets-Sheet 1
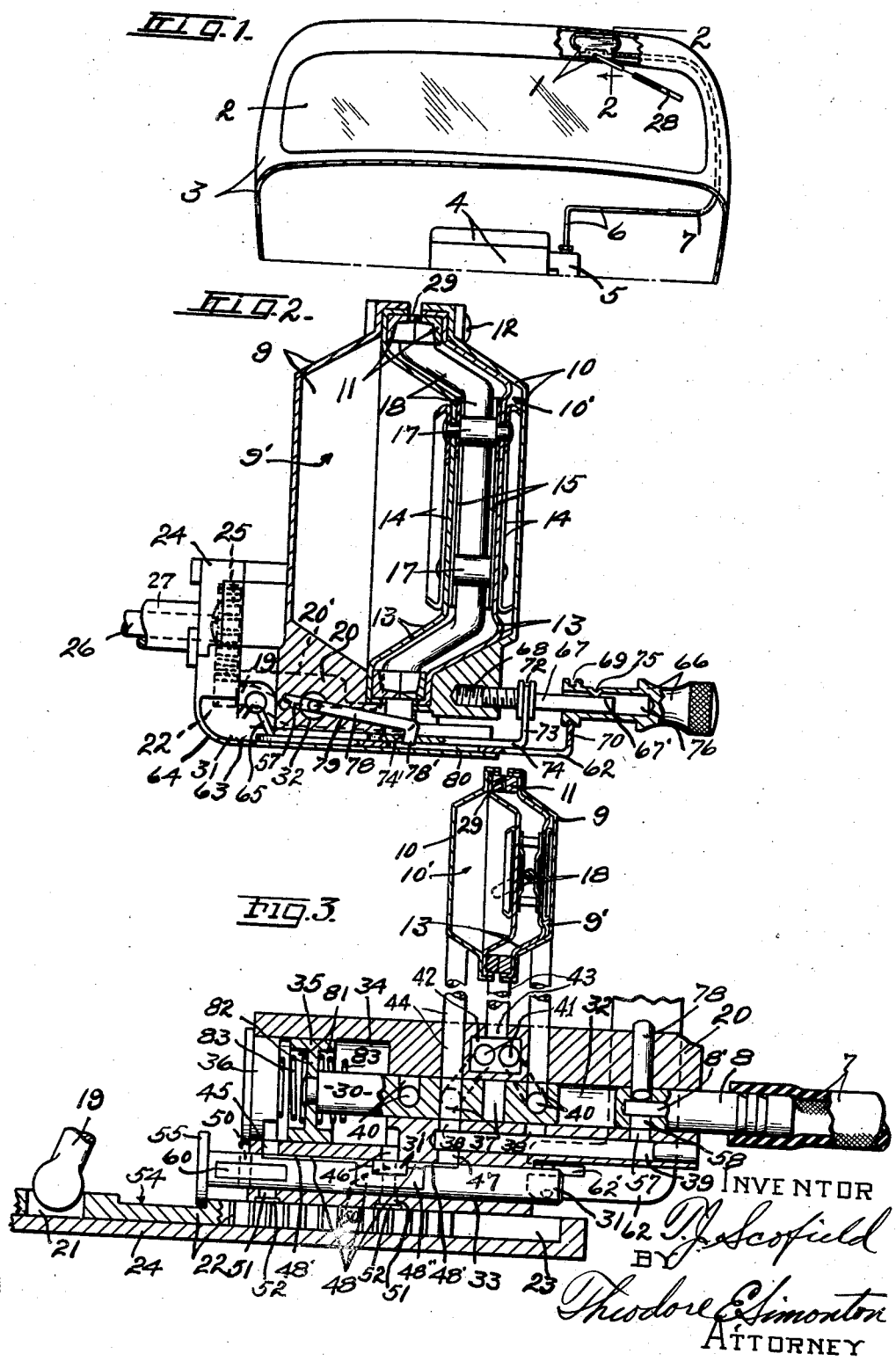

Nov. 29, 1938.                T. J. SCOFIELD                2,138,212
                        WINDSHIELD CLEANER MOTOR
                          Filed Nov. 6, 1936              2 Sheets-Sheet 2
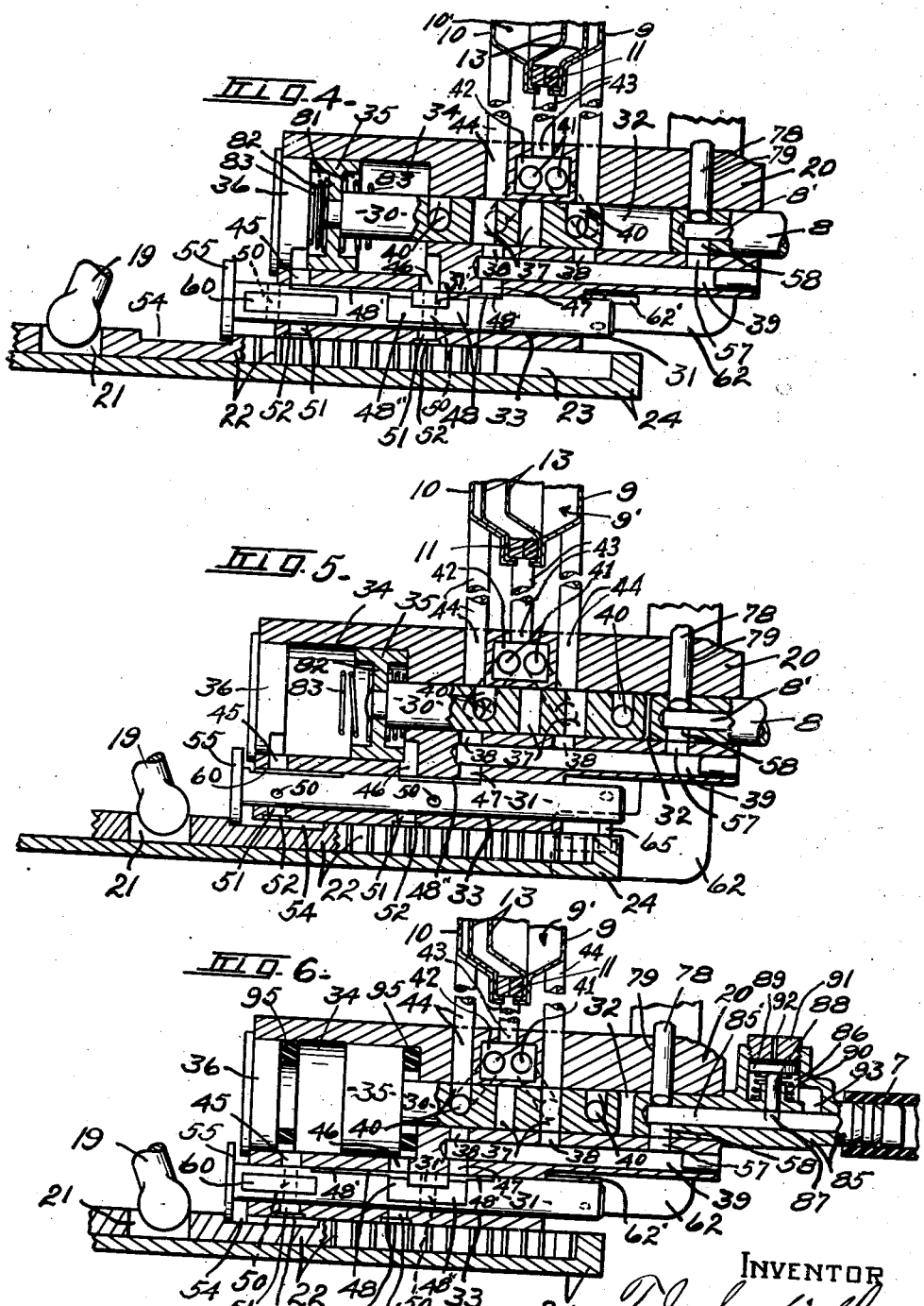
INVENTOR
T. J. Scofield
BY
Theodore E. Simonton
ATTORNEY Patented Nov. 29, 1938

2,138,212

UNITED STATES PATENT OFFICE 2,138,212

WINDSHIELD CLEANER MOTOR

Theodore J. Scofield, Jackson, Mich., assignor to The Sparks-Withington Company, Jackson, Mich., a corporation of Ohio Application November 6, 1936, Serial No. 109,567

4 Claims. (Cl. 121—48)

This invention relates to certain new and useful improvements in windshield cleaner motors of the suction operated type.

In motors of the above mentioned class for operating windshield cleaners or other accessories connected with automobiles or other vehicles operated by internal combustion engines, it is customary to derive the fluid pressure for actuating the accessory motor from the intake or suction manifold of the vehicle engine. As is well known, the suction thus created in the normal operation of a vehicle engine fluctuates in magnitude depending upon the operating condition of said engine with the result that the speed of operation of the accessory motor as usually constructed, and that of the accessory actuated thereby varies or fluctuates accordingly.

The main object of this invention is to provide a fluid pressure operated drive mechanism for windshield cleaners or other automobile accessories whereby a substantially constant speed of operation is obtained from a source of fluid operating pressure which fluctuates in magnitude.

Another object of the invention is to provide a differential fluid pressure motor for operating windshield cleaners with control means which may be incorporated within the mechanism thereof whereby the speed of operation of said motor will be constant even though the fluid operating pressure varies in magnitude at its source.

Further objects of the invention reside in providing a fluid pressure operated motor of the above mentioned class that is fully automatic and dependable in operation and which is durable and economical in construction.

These and other objects will more fully appear from the following description taken in connection with the accompanying drawings in which:

Figure 1 is a front elevation, partly in section, of the upper portion of an automobile with one embodiment of the invention attached thereto.

Figure 2 is a transverse sectional view of the windshield cleaner motor taken on line 2—2, Figure 1.

Figure 3 is a more or less diagrammatic view showing the motor and a novel automatic valve mechanism for controlling the action of the pressure fluid upon the operating element thereof and illustrating the valve members in a position they assume when operating in connection with a relatively weak suction, that is, when the variation in pressures of the opposing fluids acting upon the operating element is relatively slight.

Figure 4 is a more or less diagrammatic sectional view of the valve mechanism illustrated in Figure 3, with said valve mechanism in a position assumed when operating under relatively strong suction, that is, when the variation in pressures of the opposing fluids acting upon the operating element is relatively large.

Figure 5 is a view similar to Figure 4 illustrating the valve mechanism in a second position for reversing the application of fluid pressure to the operating element of the motor and with the auxiliary valve shifted to a position for stopping the operation of the motor.

Figure 6 is a sectional view similar to Figure 4 illustrating a modified embodiment of pressure control means associated with the motor and which is in the form of an attachment applicable to function with accessory motors of different constructions and designs.

In the drawings where similar numerals refer to similar parts throughout the several views, the numeral 1 designates a windshield wiper mounted above a windshield 2 of an automotive vehicle 3. The numeral 4 indicates an internal combustion engine for the vehicle, and 5, the intake manifold for said engine. The numeral 6 represents a flexible metallic tube connected with the intake manifold in communication with the interior thereof, while 7 represents a flexible hose or tube which connects the tube 6 with the intake nipple 8 of the windshield cleaner 1.

The windshield wiper illustrated in the drawings is similar in construction to that shown in the co-pending application of William Sparks et al., Serial No. 47,162, filed October 28, 1935, and includes a pair of complemental recessed diaphragm case members 9 and 10 composed preferably of die castings. These case members are secured together in opposed slightly spaced relation to each other by spacing rings 11 and bolts 12 as illustrated in Figure 2. The rings 11 and bolts 12 also secure a pair of diaphragms 13 to the case members, one diaphragm for each case member. These diaphragms 13 are preferably composed of rubberized fabric or other highly flexible material, and each has the central portion thereof supported by an inner plate 14 and an outer plate 15, both of which are adapted to extend into the recesses of the case members. The plates 14 and 15 are secured to the respective diaphragms and to each other in a rigid manner whereby the diaphragms will move together by means of a plurality of shouldered studs 17, two of which are illustrated in Figure 2. The outer plates 15 of the diaphragms are maintained in such spaced relation from each other by studs 17 that they will freely receive therebetween a crank shaft 18. The crank shaft, as shown more particularly in Figure 2, extends transversely of the diaphragm case members 9 and 10 and is journaled in any suitable manner at opposite sides of the case member in the clamping rings 11. The plates 15 preferably yieldingly contact with the crank shaft whereby said shaft may be rocked about its axis by the diaphragms without the shaft transmitting an appreciable endwise movement to the diaphragms and at the same time prevent lost motion between the crank shaft and the diaphragms.

A crank arm 19 is secured to or made integral with the crank shaft 18 at one end thereof and extends outwardly through a recess 20' provided in a valve housing or support 20 secured to or made integral with one of the diaphragm case members as 9. The outer end of the crank shaft is received in a recess 21 formed in one edge of a rack member 22 which is slidably supported in a longitudinally extending recess 23 provided in the inner face of a bracket 24 secured to housing 20. This rack member 22 has the teeth thereof in meshing engagement with a pinion 25 secured in any suitable manner to one end portion of a wiper arm shaft 26 which is journaled in the bracket 24 and a supporting sleeve 27 fixedly connected with said bracket. The shaft 26 extends beyond the outer end of the sleeve 27 and is adapted to have a wiper blade as 28 operatively connected therewith in any suitable manner.

It will now be understood that the diaphragms 13 cooperate with their respective case members to form separate pressure or fluid chambers as 9' and 10' and are adapted to move alternately in opposite directions by differential fluid pressures in the chambers 9' and 10' from within one pressure or fluid chamber 9' or 10' into the other. The outer or adjacent sides of the diaphragms 13 are maintained under the constant influence of atmospheric pressure by means of one or more apertures or notches 29 formed in the adjacent surfaces of the clamping rings 11, one such aperture or notch being shown in Figures 2 and 3.

Any suitable pressure fluid conveying means and valve mechanism may be utilized for alternately connecting the fluid or pressure chambers 9' and 10' with a suitable source of fluid operating pressure. As illustrated in the drawings, the valve mechanism comprises a main control valve 30 and an auxiliary valve 31, both of which are of the reciprocating type mounted in respective valve chambers 32 and 33 provided in the valve housing or support 20 in parallel spaced relation with each other. The housing 20 is also provided with a piston chamber 34 arranged at one end of the valve chamber 32 in co-axial alignment therewith, for the reception of a plunger or piston 35, fixedly secured in any suitable manner to one end of the valve 30. The outer end of the chamber portion 34 is closed by a plug 36 mounted in the outer end thereof in any suitable manner as by a press fit. The outer end of chamber 32 is closed by the hereinbefore mentioned suction nipple 8 which may also have a press fit in said chamber portion.

The valve 30 is provided with a pair of exhaust or suction ports or passages 37 arranged in spaced relation to each other longitudinally of the valve. Each of ports 37 is adapted to move into and out of registration with a respective one of a pair of exhaust or suction ports 38 formed in the housing 20 at one side of the valve chamber 32 for connecting said chamber with a suction passage 39 which extends longitudinally through said housing intermediate the valve chambers 32 and 33.

The valve 30 is also provided with a pair of intake or atmospheric ports 40 arranged in this instance, at opposite sides of the exhaust ports 37. Each of the ports 40 is adapted to move into and out of register with a respective one of a pair of inlet or atmospheric passages 41 provided in the housing 20 and which communicate with the chamber 32 in the transverse plane thereof passing through respective exhaust or suction ports 38, as illustrated by broken lines in Figures 3, 4, 5 and 6. These inlet or atmospheric passages 41 are also in communication with a common inlet or atmospheric chamber 42 formed in the housing 20 at one side of the valve chamber 32. The chamber 42 in this instance, is connected by any suitable fluid conveying means or conduit as 43 with the space between the diaphragms 13 which, as hereinbefore stated, is maintained in communication with the atmosphere by notches or apertures 29. Likewise, the fluid or pressure chambers 9' and 10' are operatively connected with the valve chamber 32 by means of a respective conduit or passage 44 formed in any suitable manner. Each conduit 44 communicates with said valve chamber in the plane passing transversely therethrough of a respective one of the exhaust or suction ports 38.

The relation of the suction ports 37 and the atmospheric or inlet ports 40 of the valve to each other and to the exhaust or suction ports 38 and inlet or atmospheric passages 41 in the valve housing is such that when the valve is moved axially to bring one of the exhaust or suction ports 37 thereof into communication with a suction port 38 in the housing 20 for connecting the suction passage 39 with one of the pressure chambers as 9', the other pressure chamber as 10' will be connected by one of the inlet or atmospheric ports 40 of the valve and passages 41 of the housing with the atmospheric or inlet chamber 42. When the valve is moved axially to another position, the connection of the pressure chamber with the suction passage and with the atmosphere will be reverse, that is, the chamber 10' will be connected with the suction passage 39 by the registration of the second valve exhaust or suction port 37 with the second exhaust or suction port 38 in the valve housing, while the pressure chamber 9' will be cut off from communication with the suction passage 39 and brought into communication with the inlet or atmospheric chamber 42 by the registration of the second inlet or atmospheric port 40 of the valve 30 with the second inlet or exhaust passages 41 of the housing.

This axial movement of the main supply control valve 30 is effected by differential fluid pressure acting on the plunger or piston 35 and for this purpose, a pair of ports or fluid passages 45 and 46 are provided in the housing 20 to maintain the ends of the chamber in communication with the hereinbefore mentioned auxiliary valve chamber 33. This auxiliary valve chamber is provided with a port 47 arranged in the housing 20 at one side of the ports 45 and 46 in communication with the suction passage 39.

The auxiliary valve 31 is provided with a peripheral groove or port 48 for alternately bringing ports 45 and 46 into communication with the port 47 and, therefore, with the suction passage 39. This peripheral groove or port 48 is, as shown in Figures 3 and 4, composed of two spaced end portions 48' arranged in longitudinal alignment with each other and which are connected by an intermediate portion 48'' arranged in circumferential spaced relation with said end portions whereby the adjacent ends of the outer portions 48' are separated by a portion 31' of the valve in alignment therewith. The valve 31 is further provided with a pair of inlet or atmospheric ports 50, one of which is arranged in outer spaced relation to the outer end portion 48' of the port 48, while the other port 50 is arranged intermediate the adjacent ends of the outer portions 48' in the plane of the valve portion 31' as shown by broken lines in Figures 3 and 4. The valve housing 20 is also provided with a second pair of atmospheric or inlet ports 51, each of which communicates with the auxiliary valve chamber 33 in the transverse plane thereof, passing through a respective one of the ports 45 and 46. These inlet or atmospheric ports 51 are maintained in constant communication with the outside atmosphere by any suitable means as by respective passages 52 formed in the housing 20.

The relation of the ports 48 and 50 of the valve 31 to each other and to the ports 45, 46, 47 and 51 in the housing 20 is such that when the auxiliary control valve is in one position as shown in Figures 3 and 4, the port 46 at the inner end of the piston chamber portion 34 is maintained in communication by the inner inlet or atmospheric valve port 50 with the inlet or atmospheric port 51 in the housing 20. Also, the other port 45 is maintained in communication with suction passage 39 by the valve port or groove 48 so that the outer end of the piston 35 is under the influence of the suction produced in the suction passage 39, while the inner end of said piston is under the influence of atmospheric pressure for maintaining the valve 30 in its outermost position. It will now be understood by referring to Figures 5 and 6 that when the auxiliary valve 31 is moved axially to its innermost position, as by the rack 22 in the manner presently described, the inner end of piston chamber portion 34 will be cut off from communication with the atmosphere and brought into communication with the suction passage 39 through the medium of the valve port 48. Similarly, the outer end of said piston chamber 34 will be cut off from communication with the suction passage 39 and brought into communication with the atmosphere by the registration of the outer atmospheric valve port 50 with the ports 45 and 51. This reversing of the suction and atmospheric pressures in the chamber 34 will effect movement of the valve 30 inwardly for reversing the application of differential pressure to the diaphragms 13 in the manner hereinbefore described.

This reciprocation of the auxiliary control valve 31 is effected through the medium of the rack 22 which, as illustrated in Figures 3, 4 and 5, is provided with a longitudinally extending slot or recess 54 in one side thereof which receives therein a flange or head member 55 provided on the outer end of the valve 31. The length of this rack recess 54 is such that the head 55 will be engaged by the ends thereof only as the rack approaches either of its extreme positions of longitudinal movement produced by the diaphragms 13 through the medium of the crank shaft 18 and crank arm 19. As shown in Figures 3, 4 and 5, the suction passage 39 is maintained in communication with the inner passage 8' of the suction nipple 8 by a port 57 formed in the housing 20 adjacent the outer end of the passage-way and a diametrically disposed passage 58 formed in the inner end of the nipple 8.

In order that the motor may be manually controlled to effect starting and stopping of the operation thereof, the auxiliary control valve 31 is provided with an atmospheric groove or port 60 arranged in the peripheral surface thereof adjacent the head 55 in substantially longitudinal alignment with the intermediate portion 48'' of the port 48. Port 60 is adapted upon rotation of the valve 31 as shown in Figure 5, to register with the suction port 45 when said valve is in either its innermost or outermost positions. This bringing of the port 60 into registration with the port 45 obviously maintains the outer end portion of the piston 35 under the influence of atmospheric pressure so that said piston and the valve 30 actuated thereby will be maintained in their innermost position until such time as said port 60 is again brought out of registration with the port 45 by the valve being rotated to its normal operative position, as illustrated in Figures 3, 4 and 6.

This rotation of the valve 31 is manually controlled by means of a slide 62 which is mounted in a transversely disposed recess 63 formed in the lower surface of the valve housing 20, adjacent one end thereof; see Figure 2. The recess 63 has the lower open side thereof closed by a plate 64 projecting laterally from the bracket 24, which plate also supports the slide 62 in the recess. The slide 62 is operatively connected with the valve 31 by means of a pin 65 secured to the end of the valve opposite the head 55 and which extends radially therefrom into an elongated recess 62' formed in the inner or forward end of the slide 62. The slide 62 is manually operated by means of a handle 66 which is slidably mounted upon a control screw 67 screw threaded in an aperture 68 provided in the adjacent portion of the diaphragm case member 10, as shown in Figure 2.

The handle 66 has the inner end thereof provided with a peripheral groove 69 which receives therein the outer end portion 70 of the plate 62, said end portion being extended laterally from the plate at substantially right angles thereto. It is thus evident that when the handle 66 is moved longitudinally of the screw 67, a similar motion will be transmitted to the slide 62 for rocking the valve 31 through the medium of the pin 65.

The handle 66 is also utilized for controlling the speed of operation of the motor and for this purpose, said screw is provided with a peripheral groove or recess 72 intermediate the ends thereof which rotatably receives therein the outer upturned end portion 73 of a second control slide 74 which is slidably mounted upon the slide 62 as shown in Figure 2. The longitudinal movement of the slide 74 is effected by screw threading the control screw 67 into and out of the aperture 68 and for this purpose, one side of the outer end portion of the control screw is flattened as at 67' while the handle 66 is provided with a flattened portion 75 formed, as illustrated in Figure 2 by indenting a portion of the side wall thereof inwardly into the bore 76 of said handle.

A valve member 78 which, in this instance, is in the form of a rod, is mounted for longitudinal reciprocative movement in a bore 79 formed in valve housing 20 opposite the suction passage 39, in alignment with the suction nipple aperture 58. The outer end of the valve member 78 has a laterally extending portion 78' which projects into a hole 74' provided in the slide 74 adjacent the forward or inner end thereof. The portion 78' of the valve extends a short distance beyond the plate 74 into a longitudinally extending slot 80 provided in the slide 62 so that the slides 62 and 74 may freely operate independently of each other, and at the same time provide for the positive connection of valve 78 with the relatively thin slide 74. It will now be understood that the longitudinal movement of the slide 74 will move the valve 78 relative to the passage 8' in the suction nipple 8 for increasing or decreasing the effective size thereof and thereby governing the flow of pressure fluid therethrough for increasing or decreasing the speed of operation of the diaphragms 13.

The apparatus thus far described is of the same general construction and operates in substantially the same manner as the windshield cleaner motor described in the hereinbefore mentioned application of William Sparks et al. with possibly the exception of the structure of the piston 35. The piston 35, in this instance, is a substantially cylindrical member provided with a recess 81 in each end thereof which are separated by a transversely disposed wall 82. In each recess 81 is mounted a coil spring 83. Each of these springs, as illustrated in Figures 3 and 4, is of conical formation, and is secured in substantial co-axial relation with the piston with the larger or butt end thereof secured to the transverse wall 82 of the piston by any suitable means, so that the springs will move in unison with the piston. The springs 83 extend outwardly beyond the adjacent end face of the piston such a distance that when the exhaust or suction ports 37 are in full registration with the corresponding ports 38, the outer end of the corresponding spring will contact with the adjacent end of the chamber 34 without said spring being compressed to any appreciable extent.

The ports 37 and 40 of the valve 30 and the associated ports or passages formed in the valve housing 20 are of exceptionally large capacity so that when the said ports of the piston are in full registration with the corresponding ports or passages of the valve housing, the diaphragms 13 will be operated with the maximum speed. If, on the other hand, the ports 37 and 40 of the valve are in only partial registration with the corresponding ports or passages of the valve housing, it follows that the speed of operation of the diaphragms will be correspondingly reduced, provided the operating fluid is maintained at the same degree of pressure in both instances. It will now be apparent that, inasmuch as the movement of the valve 30 is effected by the same pressure fluid which actuates the diaphragms 13, the speed of operation of the valve will increase or decrease as the pressure of the operating fluid increases or decreases.

In other words, when the fluid operating pressure is relatively weak, the speed of operation of the valve 30 will be relatively slow with the result that as the springs 83 come into contact with the respective end of the chamber 34, the resistance offered thereby will be sufficient to maintain the piston against further movement in the corresponding direction and thus maintain the ports of said valve in full registration with the ports of the valve housing as shown in Figure 3. It will be seen, therefore, that when operating with a relatively weak fluid pressure, the diaphragm would be operated with a maximum efficiency for that pressure.

If now the degree of pressure of the operating fluid increases, the effect thereof upon the piston 35 will be to actuate said piston with more force and at a high rate of speed with the result that the springs 83 will be compressed to greater or lesser degree as they engage the corresponding end of the piston chamber 34 before the piston comes to the at rest position. The valve 30 will, therefore, be moved inwardly or outwardly a corresponding distance beyond its normal path of movement with the result that the ports of said valve will only partially register with the ports of the valve housing, as shown in Figures 4 and 5. It follows, therefore, that the flow of the fluid through the valve mechanism will be restricted a corresponding amount so that the speed of operation of the diaphragms will be maintained substantially equal to the speed thereof when the ports are fully open and operating under a relatively weak fluid pressure. The speed of operation of the diaphragms is thus maintained by the action of the springs 83 in conjunction with the fluid operating pressure substantially constant irrespective of any fluctuations within certain limits in the magnitude of the fluid operating pressure, produced in the intake manifold 5 of the engine 4.

In Figure 6 there is shown a modification whereby the speed of operation of the operating means of the motor may be automatically controlled irrespective of the valve structure and of said motor. This means, as illustrated, is in the form of an attachment and is associated with a suction nipple 85 which may be connected with the valve housing 20 and with the flexible tubing 7 in the same manner in which the suction nipple 8 is connected therewith. This nipple 85 is of novel construction in that it is provided with a valve chamber 86 arranged at one side of the central passage 85' extending through the nipple. The valve chamber 86 is connected with the passage 85' by means of an aperture 87 in which is slidably mounted a valve 88 adapted to extend into the passage 85' for controlling the capacity thereof. The valve 88 also extends outwardly into the chamber 86 and has mounted thereon a disk or piston 89 which has a close sliding fit in the chamber 86. A spring 90 mounted in said chamber between the inner end thereof and the disk or piston 89 is adapted to normally maintain the valve in its outermost position with the inner end thereof in substantial alignment with the adjacent side of the passage 85'. The chamber 86 has the outer end thereof closed by a plug 91 which is provided with a bleed hole 92 to permit atmospheric pressure to be maintained at all times at the outer end of the piston 89. The chamber 86 is also connected with the passage 85' by a by-pass 93 which communicates with the chamber at the inner side of the piston 89 so that said piston will be maintained under the influence of the suction in the passage 85'.

The tension of the spring 86 is such that when the suction is relatively weak, the valve 88 will be maintained in its outermost position with the passage 85 unrestricted thereby. As the pressure of the operating fluid increases, the action thereof upon the piston 89 will move the valve inwardly a corresponding degree against the action of the spring 86 and thereby restrict the passage 85' a corresponding amount. It will thus be understood that in the construction shown in Figure 6, the valve 30 has the same degree of movement under all suction and that the ports 37 and 40 of said valve will always be in full registration with the ports 38 and passages 41 and 44 of the valve housing 20 to maintain a passage through the automatic valve mechanism for the motor of maximum capacity. The movement of the valve 30 in this instance, is limited by a pair of buffer rings 95 composed of leather, rubber, or other suitable material mounted one in either end of the piston chamber 34 to be engaged by the piston during the reciprocating movements thereof.

It will now be readily understood that whether the structure shown in Figures 3, 4 and 5 or that shown in Figure 6 is used, the speed of operation of the diaphragm 13 or other operating means actuated by differential fluid pressure may be manually controlled by the manipulation of the slide control handle 66 through the medium of the slide 74 and valve 78 and that this speed of operation will be maintained substantially constant, irrespective of any fluctuation in the magnitude of the fluid operating pressure by producing a corresponding change in the capacity of the fluid conveying means, which in turn, produces a corresponding change in the flow of the pressure operating fluid to and from the pressure chambers 9' and 10'.

Although I have shown and particularly described the preferred embodiments of my invention, I do not wish to be limited to the exact construction shown, as it is evident that various changes may be made in the form and relation of the parts thereof without departing from the spirit of the invention as set forth in the appended claims.

I claim:

1. A speed control for a fluid pressure motor having a valve support provided with fluid passages therein connected with the pressure chambers of the motor and with the atmosphere and with a suction passage adapted to be connected with a source of suction, a main control valve associated with the suction passage, said valve being provided with suction and atmospheric ports, means for actuating the valve by differential fluid pressure for bringing the ports into and out of registration with the passages to alternately connect the pressure chambers with the source of suction and with the atmosphere, and pressure responsive means connected to be actuated by said first mentioned means adapted to automatically govern the movement of said valve for automatically controlling the degree of registration of the ports with said fluid passages to maintain a substantially constant rate of operation of the motor.

2. A speed control for a fluid pressure motor having a valve support provided with fluid passages connected with the pressure chambers of the motor and with the atmosphere and a suction passage adapted to be connected with a source of suction, a main control valve associated with the suction passage, said valve being provided with suction and atmosphere ports, means for actuating the valve by differential fluid pressure for bringing the ports into and out of registration with the passages to alternately connect the pressure chambers with the source of suction and with the atmosphere, and spring means interposed between the valve support and said first mentioned means independent of said suction passage for automatically controlling the degree of registration of the ports with said fluid passages during fluctuations in the magnitude of the fluid pressure in said suction passage to maintain a substantially constant rate of operation of the motor.

3. In a fluid pressure motor for operating a windshield cleaner element or the like, having fluid pressure chambers, fluid conveying means for alternately connecting said chambers with the atmosphere and with a source of variable suction comprising a valve case, a main supply control valve mounted in said case, operating means adapted to be engaged by differential fluid pressure for actuating said valve, a positively driven auxiliary valve mounted in said case for controlling the supply of fluid pressure to said operating means, and resilient means co-acting with the case and with said operating means for the main supply valve independently of the auxiliary valve for producing changes in the movement of said main supply valve in accordance with changes in the value of the fluid pressure operating said main supply valve.

4. In a fluid pressure motor having fluid pressure chambers, fluid conveying means for alternately connecting said chambers with a source of variable fluid pressure comprising a valve case having intake and exhaust fluid passages in communication with the interior thereof and with said pressure chambers, a main supply valve mounted for reciprocative movement in said case and provided with intake and exhaust ports for alternately connecting certain of the intake passages with corresponding exhaust passages, a piston connected with said valve to move therewith, means for alternately connecting opposite sides of the piston with the source of operating fluid pressure to operate said valve, and resilient means co-acting with said case and with the piston at the end of the stroke of said piston adapted to cause an increase in the amount of reciprocative movement of the valve as the value of the operating pressure increases to vary the degree of registration of said intake and exhaust passages with each other.

THEODORE J. SCOFIELD.